United States Patent [19]

Nishimura et al.

[11] Patent Number: 4,637,630
[45] Date of Patent: Jan. 20, 1987

[54] WEBBING TENSION ADJUSTING APPARATUS

[75] Inventors: Yuji Nishimura; Teruhiko Koide, both of Niwa, Japan

[73] Assignee: Kabushiki Kaisha Tokai-Rika-Denki-Seisakusho, Aichi, Japan

[21] Appl. No.: 745,948

[22] Filed: Jun. 18, 1985

[30] Foreign Application Priority Data

Jun. 21, 1984 [JP] Japan ............................ 59-93104[U]

[51] Int. Cl.$^4$ ............................................. B60R 22/44
[52] U.S. Cl. ...................................... 280/807; 242/107
[58] Field of Search .................. 280/801, 802, 807; 242/107

[56] References Cited

U.S. PATENT DOCUMENTS

| 4,487,381 | 12/1984 | Kubota | 242/107 |
| 4,489,804 | 12/1984 | Kamijo | 242/107 |
| 4,588,144 | 5/1986 | Nishimura | 280/807 |
| 4,592,520 | 6/1986 | Kawaguchi | 242/107 |

FOREIGN PATENT DOCUMENTS 185350 10/1983 Japan ................................ 280/807

Primary Examiner—John J. Love
Assistant Examiner—Ross Weaver
Attorney, Agent, or Firm—Parkhurst & Oliff

[57] ABSTRACT

A webbing tension adjusting apparatus is arranged such that, when the occupant leaves the vehicle, a motor is rotated forwardly, and a takeup shaft for winding up an occupant restraining webbing thereon is thereby rotated in the webbing wind-off direction through a one-way clutch which is interposed between the motor and the webbing takeup shaft. Accordingly, the webbing is quickly wound off when the occupant leaves the vehicle, so that the webbing tension is reduced. Thus, it is possible to decrease the amount of friction or rubbing which occurs between the sliding webbing and the clothes of the occupant.

20 Claims, 9 Drawing Figures

WEBBING TENSION ADJUSTING APPARATUS

BACKGROUND OF THE INVENTION

1. Field of the Invention:

The present invention relates to an apparatus for adjusting the tension of an occupant restraining webbing which is employed in a seatbelt system designed to protect an occupant of a vehicle. More particularly, the invention pertains to a webbing tension adjusting apparatus which is capable of quickly decreasing the webbing tension when the webbing is unfastened.

2. Description of the Prior Art:

An automatic seatbelt system has heretofore been proposed in which an occupant restraining webbing has one of its ends secured to a door of a vehicle and the other end secured to the approximate center of the vehicle. In this seatbelt system, when an occupant of the vehicle opens the door, the webbing is wound off from a webbing retractor, and the end of the webbing secured to the door is moved toward the front end of the vehicle in response to the pivoting movement of the opening door. It is therefore possible for the occupant to be released from the webbing restrained condition when leaving the vehicle simply by opening the door. Further, when the occupant closes the door after entering the vehicle, the end of the webbing secured to the door is moved toward the rear end of the vehicle, and it is therefore possible for the occupant to be automatically fastened by the webbing simply by closing the door after seating himself.

This type of seatbelt system, however, suffers from the following problem. When the occupant opens the door for the purpose of leaving the vehicle, the webbing which is being wound off from the webbing retractor in response to the door opening operation moves and undesirably rubs against the clothes of the occupant.

SUMMARY OF THE INVENTION

In view of the above-described fact, it is a primary object of the present invention to provide a webbing tension adjusting apparatus which is capable of decreasing the amount of friction or rubbing which occurs between the sliding webbing and the clothes of the occupant when he opens the door for the purpose of leaving the vehicle.

To this end, the invention provides a webbing tension adjusting apparatus in which, when the occupant opens the door for the purpose of leaving the vehicle, a one-way clutch is rotated forwardly by a driving means such as to be connected to a webbing takeup shaft, and the webbing is thereby wound off from the webbing retractor.

Thereafter, the one-way clutch is rotated backwardly by the driving means in such a manner that the connection between the one-way clutch and the webbing takeup shaft is cancelled, and the takeup shaft is rotated by the biasing force of a resilient member, thereby allowing the webbing to be wound up on the takeup shaft.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

Figure 8:
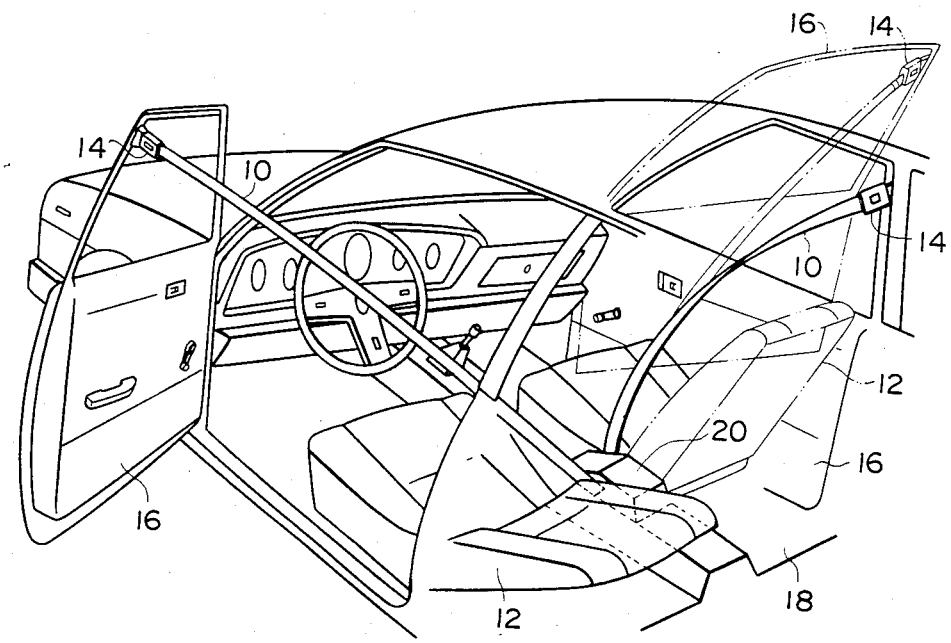
FIG. 8 is a perspective view of an automobile to which the webbing tension adjusting apparatus of the invention is applied.

Referring first to FIG. 8, there is shown an automobile to which a webbing tension adjusting apparatus in accordance with one embodiment of the present invention is applied. In this embodiment, an occupant seating himself in a seat 12 is automatically fastened by a shoulder webbing 10.

More specifically, one end of the shoulder webbing 10 is retained through a shoulder anchor 14 at the upper portion of a door 16 on the side thereof which is closer to the rear end of the vehicle, while the other end of the shoulder webbing 10 is wound up into a webbing retractor provided within a casing 20 which is mounted on a floor member 18 in the center of the vehicle. The shoulder anchor 14 may be of a structure which enables the shoulder webbing 10 to be removed therefrom, if necessary.

Figure 1:
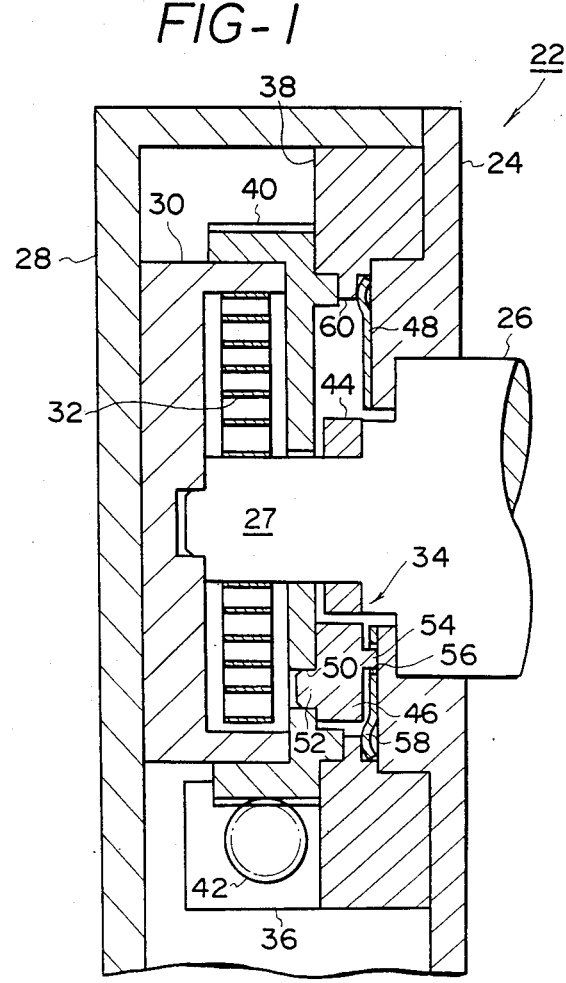
FIG. 1 is a fragmentary sectional view of a first embodiment of the webbing tension adjusting apparatus according to the present invention.

Referring next to FIG. 1 which is a fragmentary sectional view of a webbing retractor 22, a webbing takeup shaft 26 has both its end portions rotatably supported by a base 24. The takeup shaft 26 has a shaft member 27 projecting from one of its end portions. The base 24 and the shaft member 27 are covered with a cover 28 which is secured to the base 24, whereby a housing chamber for housing the webbing tension adjusting apparatus is defined between the base 24 and the cover 28. A casket or spring case 30 is secured to the inner surface of the cover 28 such as to oppose the shaft member 27. A spiral spring 32 is housed in the casket 30. The spring 32 has its inner end retained by the shaft member 27 and its outer end retained by the inner peripheral surface of the casket 30. The spiral spring 32 biases the takeup shaft 26 in the direction in which an occupant restraining webbing is wound up. The arrangement is such that it is possible for the takeup shaft 26 to wind up the entire length of the webbing thereon by means of the biasing force of the spring 32.

Further, the arrangement is such that it is possible for the takeup shaft 26 to be rotated in the webbing wind-off direction by means of the driving force of a motor 36 through a one-way clutch 34. More specifically, a fixed ring 38 is secured to the base 24 in coaxial relation to the takeup shaft 26. A worm wheel 40 is supported between the fixed ring 38 and the casket 30 in coaxial relation to the shaft member 27. The worm wheel 40 is engaged with a worm 42 which is secured to the shaft of the motor 36. On the other hand, a connecting gear 44 is fixedly fitted on the shaft member 27.

The worm wheel 40 and the connecting gear 44 are connected together by means of connecting arms 46 and a guide plate 48. More specifically, the worm wheel 40 has pivotally supporting bores 50 formed in its end face and these pivotally support pins 52 which are respectively provided on the connecting arms 46. Each of the connecting arms 46 further has a pin 54 projecting in the opposite direction relative to the projecting direction of the associated pin 52. The pin 54 is received in one of the guide bores 56 which are formed in the guide plate 48.

Figure 2:
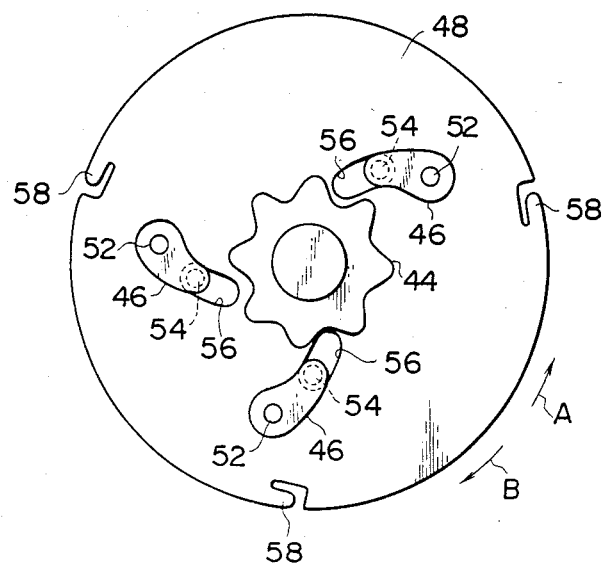
FIG. 2 is a front elevational view of the clutch portion of the embodiment shown in FIG. 1.

The guide plate 48 is, as shown in FIG. 2, formed into a disk-like shape. The guide plate 48 is cut and bent so as to provide on its outer periphery bent portions 58. These bent portions 58 are interposed between a projection 60 which is provided on the fixed ring 38 and the base 24 in such a manner that the bent portions 58 respectively serve as leaf springs which cause the guide plate 48 to come into resilient contact with the base 24. Accordingly, the guide plate 48 is prevented from undesirably sliding or rotating relative to the base 24.

As shown in FIG. 2, as the connecting arms 46 are pivoted in the direction of the arrow A in response to the rotation of the worm wheel 40, the pins 54 are guided by the corresponding guide bores 56 such as to be respectively engaged with recessed portions on the outer periphery of the connecting gear 44. This engagement is prevented from being undesirably cancelled by virtue of the guide bores 56. When the worm wheel 40 further rotates in the direction of the arrow A, the connecting gear 44 and the guide plate 48 are rotated together with the worm wheel 40 in one unit. When the worm wheel 40 is rotated backwardly, the connecting arms 46 are moved in the direction of the arrow B. In consequence, the pins 54 are guided by the guide bores 56 in such a manner as to be separated from the respective recessed portions on the connecting gear 44, whereby the connection between the worm wheel 40 and the connecting gear 44 is cancelled.

The worm wheel 40 is engaged with the gear of a reduction device (not shown), whereby a printed board 62 (shown in FIG. 3) which is secured to the output rotating shaft of the reduction device is rotated at reduced speed. The printed board 62 is printed with contacts 64 and 66. On the other hand, terminals 64A and 64B are disposed on a fixed-side member (24, 28, 30 or 38) in such a manner as to oppose the contact 64. Further, terminals 66A and 66B are disposed on the fixed-side member such as to oppose the contact 66.

Figures 3A, 3B:
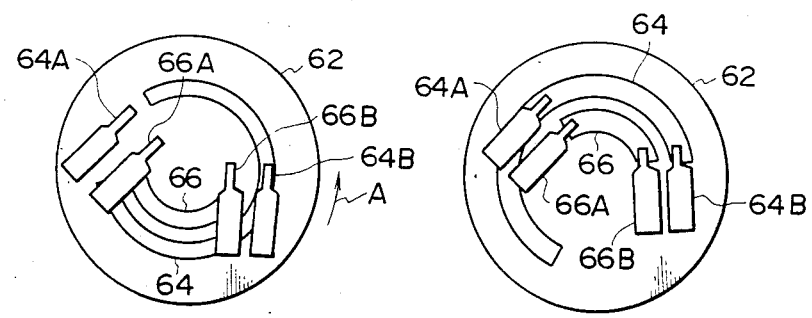
FIG. 3 is a schematic view of a switch employed in the embodiment shown in FIG. 1 for detecting a webbing initial position and a webbing wind-off completion position.

FIG. 3(A) shows the printed board 62 in a state wherein the occupant is fastened by the webbing. In this state, the terminals 64A and 64B as well as the terminals 66A and 66B are electrically disconnected, that is, in a non-conducting condition. As the motor 36 rotates forwardly, the printed board 62 is rotated in the direction of the arrow A, and when a necessary length of the webbing is wound off from the takeup shaft 26, the printed board 62 is brought into the state shown in FIG. 3(B). In this state, the terminals 64A and 64B as well as the terminals 66A and 66B are electrically connected, that is, put into a conducting condition.

Figure 4:
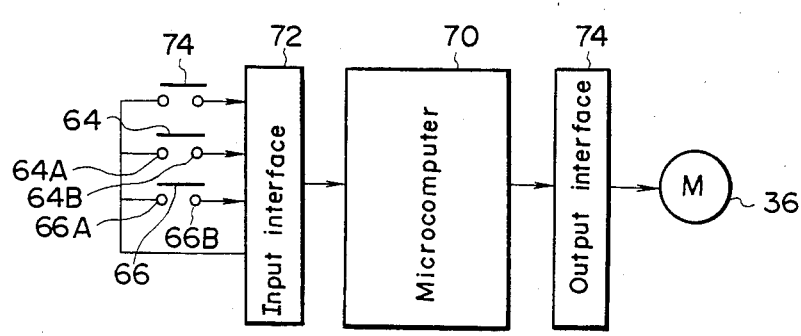
FIG. 4 is a block diagram of a control circuit for the webbing tension adjusting apparatus according to the invention.

The webbing tension adjusting apparatus is, as shown in FIG. 4, controlled by a microcomputer 70. Actuating signals which are respectively delivered from the contacts 64, 66 and an actuating signal from a door switch 74 are input to the microcomputer 70 through an input interface 72. The door switch 74 is arranged such that the switch turns ON when the door 16 is opened and turns OFF when the door 16 is closed. The microcomputer 70 outputs a control signal to the motor 36 through an output interface 74.

Figure 5:
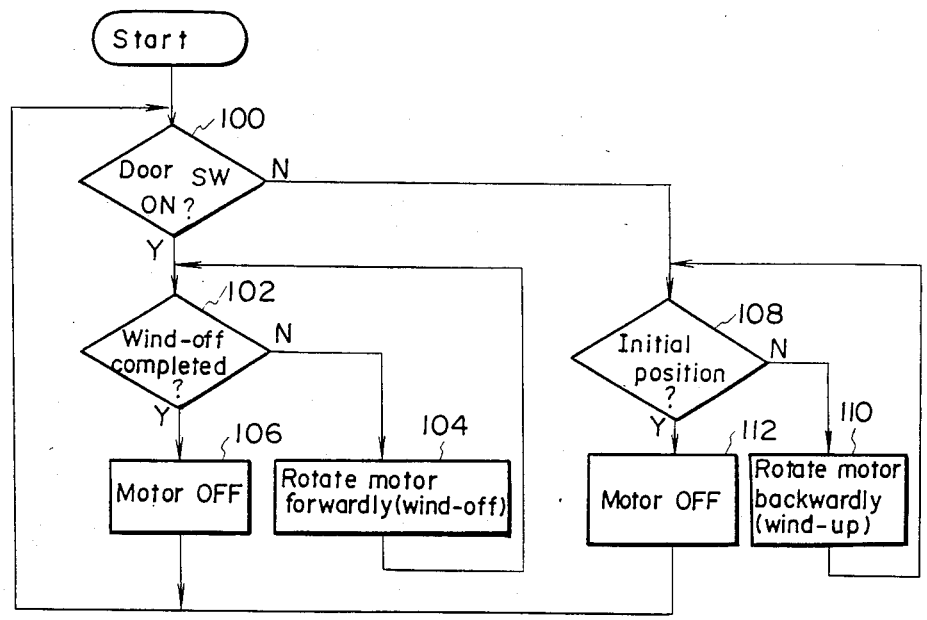
FIG. 5 is a flow chart correponding to a program stored in the microcomputer shown in FIG. 4.

FIG. 5 is a flow chart which corresponds to a program stored in an ROM of the microcomputer 70. The operation of the first embodiment arranged as above will be described hereinunder in accordance with this flow chart.

In a step 100, the route to be taken is decided according to whether the door switch 74 is ON or OFF. The door switch 74 turns ON when the occupant opens the door 16 for the purpose of entering or leaving the vehicle. When the door switch 74 turns ON, the motor 36 is forwardly rotated in steps 102 and 104 until the terminals 64A and 64B are electrically connected by the contact 64. More specifically, the connecting arms 46 are pivoted in the direction of the arrow A in FIG. 2 through the worm 42 and the worm wheel 40, and the pins 54 are respectively engaged with the recessed portions on the connecting gear 44. The takeup shaft 26 is then rotated in the webbing wind-off direction together with the worm wheel 40 in one unit.

Thus, the webbing is quickly wound off from the webbing retractor 22 in response to the door opening operation, and there is therefore no risk of the webbing rubbing against the clothes of the occupant when he opens the door 16. Accordingly, it is possible for the occupant to leave the vehicle comfortably.

When a necessary length of the webbing has been wound off, the rotation of the motor 36 is suspended in a step 106.

When the occupant closes the door 16 after entering or leaving the vehicle, the door switch 74 turns OFF, and the motor 36 is caused to rotate backwardly in steps 108 and 110 until the printed board 62 is rotated such as to reach its initial position shown in FIG. 3(A), that is, until the contacts 64 and 66 respectively cancel the electrical connection between the terminals 64A and 64B and that between the 66A and 66B. The backward rotation of the motor 36 causes the connecting arms 46 to be pivotally moved in the direction of the arrow B in FIG. 2 through the worm 42 and the worm wheel 40. In consequence, the pins 54 are guided by the associated guide bores 56 such as to be separated from the respective recessed portions of the connecting gear 44, whereby the connection between the worm wheel 40 and the connecting gear 44 is cancelled. Then, the takeup shaft 26 is rotated in the webbing wind-up direction by means of the biasing force of the spiral spring 32. Thus, the occupant is automatically brought into a webbing restrained condition.

It is to be noted that, even after the connection between the worm wheel 40 and the connecting gear 44 has been cancelled, the printed board 62 still rotates in the direction of the arrow A in FIG. 3, and the rotation of the motor 36 is suspended in a step 112 when the printed board 62 reaches its initial position.

Figure 6:
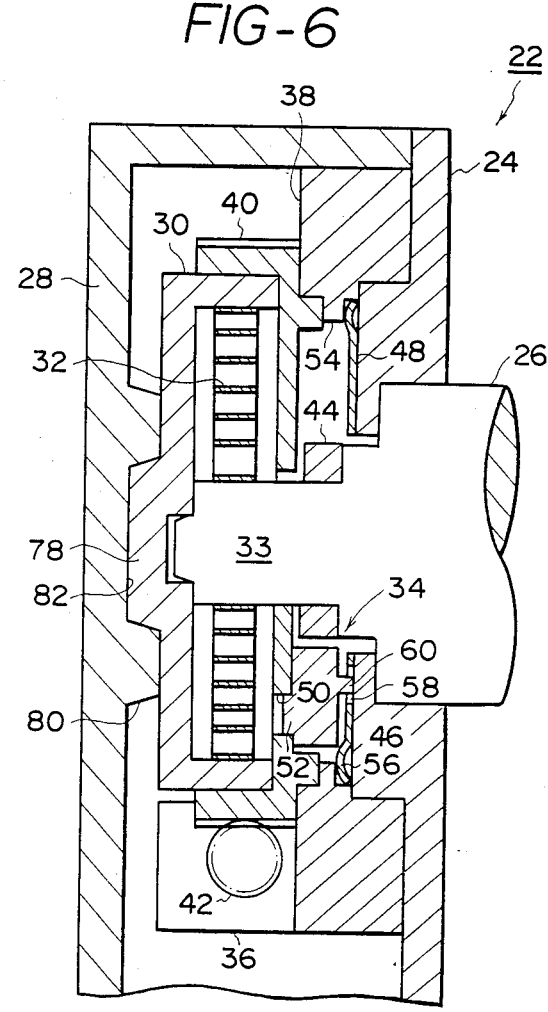
FIG. 6 is a fragmentary sectional view corresponding to FIG. 1 and showing a second embodiment of the webbing tension adjusting apparatus according to the invention.

A second embodiment of the present invention will now be described with reference to FIG. 6. In the second embodiment, the casket 30 is secured to the worm wheel 40 and adapted to rotate together with the worm wheel 40 in one unit. The casket 30 has a projecting portion 78 provided at the center of its end face. On the other hand, the cover 28 has a ring 80 formed thereon such as to project therefrom. The projecting portion 78 is fitted into a recess 82 which is defined by the ring 80. The casket 30 and the worm wheel 40 are rotatably supported by the fixed ring 38 and the cover 28. The arrangement of the other members and portions is similar to that in the first embodiment.

Accordingly, the casket 30 is adapted to rotate together with the worm wheel 40 and the takeup shaft 26 in one unit in the above-described steps 102 and 104. Further, the intensity of the biasing force applied by the spiral spring 32 has already been reduced when the engagement between the pins 54 and the connecting gear 44 is cancelled in the steps 108 and 110. The biasing force of the spiral spring 32 is, however, gradually increased until its intensity reaches the force derived from the spring 32 in its initial state by the backward rotation of the motor 36 in the step 110. Accordingly, when the occupant is fastened by the webbing, it is possible to prevent the webbing from being abruptly wound up into the webbing retractor 22.

It is to be noted that the arrangement may be such that the casket 30 is not provided and the outer end of the spiral spring 32 is retained by the inner peripheral surface of the worm wheel 40.

Figure 7:
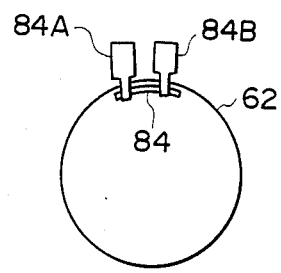
FIG. 7 is a schematic view corresponding to FIG. 3 and showing a third embodiment of the webbing tension adjusting apparatus according to the invention.

The following is a description of a third embodiment of the present invention with reference to FIG. 7. In the third embodiment, the structure shown in FIG. 3 is simplified. More specifically, the printed board 62 is printed with only one contact 84. Further, terminals 84A and 84B are secured to the fixed-side member in such a manner as to oppose the contact 84. The printed board 62 is adapted to rotate one full turn when it rotates from the initial position to the webbing wind-off completion position. Accordingly, the terminals 84A and 84B are electrically connected through the contact 84 when the webbing is in the initial state and in the wind-off completion state.

What is claimed is:

1. A webbing tension adjusting apparatus employed in a webbing retractor in which a takeup shaft for winding up an occupant restraining webbing is biased in the webbing wind-up direction by a resilient member, which comprises:
    (a) driving means adapted to actuate said webbing takeup shaft when said means is rotated forwardly such that said takeup shaft is rotated in the webbing wind-off direction; and
    (b) a one-way clutch adapted such that, when said driving means is rotated forwardly, said clutch connects said driving means and said webbing takeup shaft, while when said driving means is rotated backwardly, said clutch cancels the connection therebetween,
    whereby it is possible to reduce the tension of said webbing when the occupant leaves the vehicle.

2. A webbing tension adjusting apparatus according to claim 1, wherein said one-way clutch includes: a worm wheel disposed such as to be rotatable relative to said webbing takeup shaft and coaxial therewith; a connecting gear coaxially secured to said webbing takeup shaft; a connecting arm supported by said worm wheel and engaged with said connecting gear when said driving means is rotated forwardly such as to transmit the rotational force of said worm wheel to said connecting gear; and a guide plate for guiding the movement of said connecting arm.

3. A webbing tension adjusting apparatus according to claim 2, wherein said guide plate has a guide bore which guides said connecting arm in the direction in which it engages with said connecting gear when said driving means is rotated forwardly and which guides said connecting arm in the direction in which it is separated from said connecting gear when said driving means is rotated backwardly.

4. A webbing tension adjusting apparatus according to claim 3, wherein said guide plate is provided with rotation preventing means.

5. A webbing tension adjusting apparatus according to claim 4, wherein said rotation preventing means is constituted by a bent portion which is formed by cutting and bending an outer peripheral portion of said guide plate, said bent portion being resiliently interposed between a base rotatably supporting said webbing takeup shaft and a fixed ring secured to said base, whereby rotation of said guide plate is prevented.

6. A webbing tension adjusting apparatus according to claim 5, wherein said resilient member is a spiral spring which has its inner end retained by said webbing takeup shaft and its outer end retained by a casket secured to a cover which is secured to said base in such a manner as to cover said base, whereby said webbing takeup shaft is biased in the webbing wind-up direction.

7. A webbing tension adjusting apparatus according to claim 5, wherein said resilient member is a spiral spring which has its inner end retained by said webbing takeup shaft and its outer end retained by a casket which is secured to said worm wheel and adapted to rotate together therewith in one unit, whereby said webbing takeup shaft is biased in the webbing wind-up direction.

8. A webbing tension adjusting apparatus according to claim 7, wherein said casket has a projecting portion formed at the center of its end face, said cover being formed with a ring which receives said projecting portion, whereby said casket is rotatable relative to said cover.

9. A webbing tension adjusting apparatus according to claim 6, further comprising means for controlling said driving means such that said driving means is rotated forwardly when the occupant leaves the vehicle and is rotated backwardly thereafter.

10. A webbing tension adjusting apparatus according to claim 8, further comprising means for controlling said driving means such that said driving means is selectively rotated forwardly and backwardly.

11. A webbing tension adjusting apparatus employed in a webbing retractor for use in a seatbelt system for a vehicle and adapted to adjust the tension of an occupant restraining webbing wound up on a webbing takeup shaft by means of a biasing force of a resilient member, which comprises:
    (a) driving means adapted to actuate said webbing takeup shaft when said driving means is rotated forwardly such that said takeup shaft is rotated in the webbing wind-off direction;
    (b) a one-way clutch disposed between said driving means and said webbing takeup shaft and adapted such that said clutch connects said driving means and said webbing takeup shaft when said driving means is rotated forwardly and cancels the connection therebetween when said driving means is rotated backwardly; and (c) means for controlling said driving means such that said driving means is rotated forwardly when the occupant leaves the vehicle and is rotated backwardly thereafter, whereby it is possible to reduce the tension of said webbing when the occupant leaves the vehicle.

12. A webbing tension adjusting apparatus according to claim 11, wherein said one-way clutch includes: a worm wheel disposed such as to be rotatable relative to said webbing takeup shaft and coaxial therewith; a connecting gear coaxially secured to said webbing takeup shaft; a connecting arm supported by said worm wheel and engaged with said connecting gear when said driving means is rotated forwardly such as to transmit the rotational force of said worm wheel to said connecting gear; and a guide plate for guiding the movement of said connecting arm.

13. A webbing tension adjusting apparatus according to claim 12, wherein said guide plate has a guide bore which guides said connecting arm in the direction in which it engages with said connecting gear when said driving means is rotated forwardly and which guides said connecting arm in the direction in which it is separated from said connecting gear when said driving means is rotated backwardly.

14. A webbing tension adjusting apparatus according to claim 13, wherein said guide plate is provided with rotation preventing means.

15. A webbing tension adjusting apparatus according to claim 14, wherein said rotation preventing means is constituted by a bent portion which is formed by cutting and bending an outer peripheral portion of said guide plate, said bent portion being resiliently interposed between a base rotatably supporting said webbing takeup shaft and a fixed ring secured to said base, whereby rotation of said guide plate is prevented.

16. A webbing tension adjusting apparatus according to claim 15, wherein said resilient member is a spiral spring which has its inner end retained by said webbing takeup shaft and its outer end retained by a casket secured to a cover which is secured to said base in such a manner as to cover said base, whereby said webbing takeup shaft is biased in the webbing wind-up direction.

17. A webbing tension adjusting apparatus according to claim 15, wherein said resilient member is a spiral spring which has its inner end retained by said webbing takeup shaft and its outer end retained by a casket which is secured to said worm wheel and adapted to rotate together therewith in one unit, whereby said webbing takeup shaft is biased in the webbing wind-up direction.

18. A webbing tension adjusting apparatus according to claim 17, wherein said casket has a projecting portion formed at the center of its end face, said cover being formed with a ring which receives said projecting portion, whereby said casket is rotatable relative to said cover.

19. A webbing tension adjusting apparatus employed in a webbing retractor having a takeup shaft for winding up an occupant restraining webbing thereof, which comprises:

(a) a base rotatably supporting said webbing takeup shaft;

(b) a resilient member biasing said webbing takeup shaft in the webbing wind-up direction;

(c) driving means adapted to actuate said webbing takeup shaft when said driving means is rotated forwardly such that said takeup shaft is rotated in the webbing wind-off direction;

(d) a one-way clutch interposed between said driving means and said webbing takeup shaft and adapted such that said clutch connects said driving means and said takeup shaft when said driving means is rotated forwardly and cancels the connection therebetween when said driving means is rotated backwardly; and (e) means for controlling said driving means such that said driving means is rotated forwardly when the vehicle door is opened, whereby it is possible to reduce the tension of said webbing when the door is opened.

20. A webbing tension adjusting apparatus according to claim 19, wherein said one-way clutch includes: a worm wheel disposed such as to be rotatable relative to said webbing takeup shaft and coaxial therewith; a connecting gear coaxially secured to said webbing takeup shaft; a connecting arm supported by said worm wheel and engaged with said connecting gear when said driving means is rotated forwardly such as to transmit the rotational force of said worm wheel to said connecting gear; and a guide plate for guiding the movement of said connecting arm.

* * * * *